United States Patent

Presby

4,033,668

July 5, 1977

[54] SOLDERABLE GLASS SPLICES, TERMINATIONS AND HERMETIC SEALS

[75] Inventor: Herman Melvin Presby, Highland Park, N.J.

[73] Assignee: Bell Telephone Laboratories, Incorporated, Murray Hill, N.J.

[22] Filed: Apr. 8, 1976

[21] Appl. No.: 674,857

[52] U.S. Cl. .................... 350/96 C; 29/458; 65/59 R; 65/59 B; 65/DIG. 7; 228/121; 228/904; 403/272

[51] Int. Cl.² .................... G02B 5/14; C03C 27/02; B23K 1/02

[58] Field of Search .................. 350/96 C, 96 R; 174/94 R; 403/272; 65/59 R, 59 B, DIG. 7; 228/121, 254, 904; 29/458

[56] References Cited

UNITED STATES PATENTS

| | | | |
|---|---|---|---|
| 2,139,431 | 12/1938 | Vatter | 228/121 |
| 2,570,248 | 10/1951 | Kelly | 228/121 |
| 2,835,967 | 5/1958 | Umblia | 228/121 |
| 3,768,146 | 10/1973 | Braun et al. | 350/96 C |
| 3,779,628 | 12/1973 | Kapron et al. | 350/96 C |
| 3,810,802 | 5/1974 | Buhite et al. | 350/96 C |
| 3,825,319 | 7/1974 | Cook et al. | 350/96 C |
| 3,861,781 | 1/1975 | Hasegawa et al. | 350/96 C |
| 3,900,245 | 8/1975 | Dyott et al. | 350/96 C |
| 3,928,102 | 12/1975 | Rowe et al. | 350/96 C |
| 3,960,531 | 6/1976 | Kohanzadeh et al. | 350/96 C |

OTHER PUBLICATIONS

Dabby "Permanent Multiple Splices of Fused-Silica Fibers" Bell Tech. Journal, vol. 54, No. 2, Feb. 1975.
Kyle "Glass Fiber Hermetic Seals Using a $CO_2$ Laser", Applied Optics, vol. 14, No. 6, June 1976.

*Primary Examiner*—John K. Corbin
*Assistant Examiner*—Stewart Levy
*Attorney, Agent, or Firm*—Erwin W. Pfeifle

[57] ABSTRACT

The present invention relates to the joining of a first glass member, such as an optical fiber, to a second member by means of solderable splices and terminations which additionally can form hermetic seals. To form the splice, termination or seal, the peripheral surface of the glass member is coated in the area of the intended joint between members with a thin adhering metallic layer. The coated glass member is properly positioned adjacent the second member and solder is flowed around the joint between the members. Where the second member is also formed of glass, a thin adhering metallic coating layer is similarly formed on the peripheral surface thereof in the area of the intended joint prior to solder being applied.

10 Claims, 6 Drawing Figures

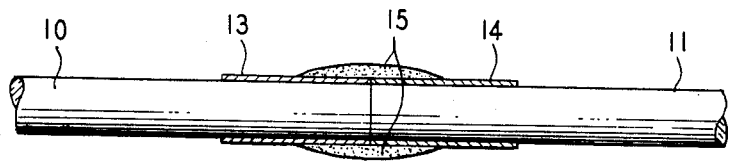
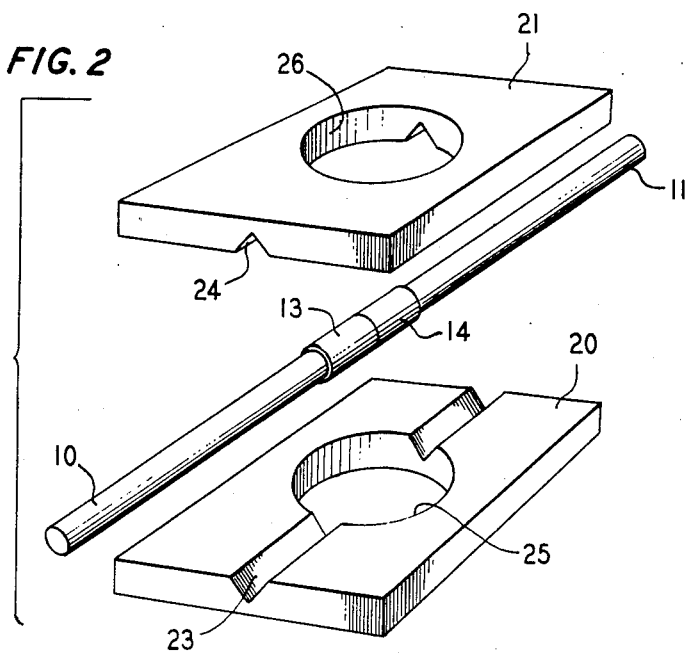
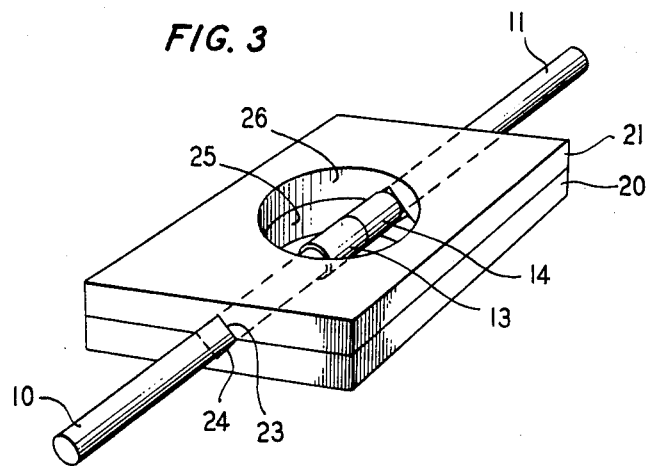

SOLDERABLE GLASS SPLICES, TERMINATIONS AND HERMETIC SEALS

BACKGROUND OF THE INVENTION

1. Field of the Invention

The present invention broadly relates to method and apparatus for joining a glass member to a second member composed of, for instance, glass or a metallic material, and more particularly, to solderable optical fiber splices, terminations and hermetic seals.

2. Description of the Prior Art

The splicing of optical fibers has, in the past, been accomplished using various techniques. A first technique forms the optical fiber splice within a sleeve which may be crimped, as in U.S. Pat. No. 3,768,146 issued to F. A. Braun et al on Oct. 30, 1973, to mutually align and mechanically secure the two fiber ends together.

A second technique places a bead of either an epoxy resin, glue, or other bonding and fixing agent around the joint to secure the butted ends of the two aligned optical fibers together as, for instance, shown in U.S. Pat. Nos. 3,779,628 issued to F. P. Kapron et al on Dec. 18, 1973; and U.S. Pat. No. 3,900,245 issued to R. B. Dyott et al on Aug. 19, 1975.

The above-mentioned techniques can be interrelated as, for instance, disclosed in U.S. Pat. No. 3,810,802 issued to P. H. Buhite et al on May 14, 1974 wherein two fibers are aligned collinearly in a hollow sleeve, a quantity of low melting point transparent thermoplastic is inserted in the sleeve at the junction of the two fibers, and heat is applied to melt the thermoplastic causing it to flow around the aligned ends and form the splice.

It is also known to use butt-welding to cause the aligned ends of two optical fibers to reach an elevated temperature sufficient to flow the materials together and form the splice.

Prior art compounds, as, for example, epoxy resins or index matching fluids, have been found to age and eventually deteriorate. Therefore, such compounds do not always possess sufficient long-term stability as may be desired, for instance, in communication systems. The problem, therefore, remaining is to provide methods for splicing or terminating glass members such as optical fibers which possess long-term stability under varying temperature and humidity.

BRIEF SUMMARY OF THE INVENTION

It is a broad aspect of the present invention to provide methods of joining a glass member to a second member formed of, for instance, glass or a metallic material, and, more particularly, to solderable optical fiber splices, terminations, and hermetic seals.

It is another aspect of the present invention to provide solderable optical fiber splices, terminations and hermetic seals wherein a thin metallic coating layer is circumferentially applied to the fiber in the area at least adjacent where the splice, termination or seal is to be made before soldering the fiber to another fiber similarly coated or to an adjacent solder adherable surface on a terminal device or a housing to form a termination and/or a hermetic seal.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 1 is a cross-sectional view of a splice formed between two glass members in accordance with the present invention;

FIGS. 2 and 3 show a form of apparatus for splicing two optical fibers in accordance with the present invention;

DETAILED DESCRIPTION

Figure 4:
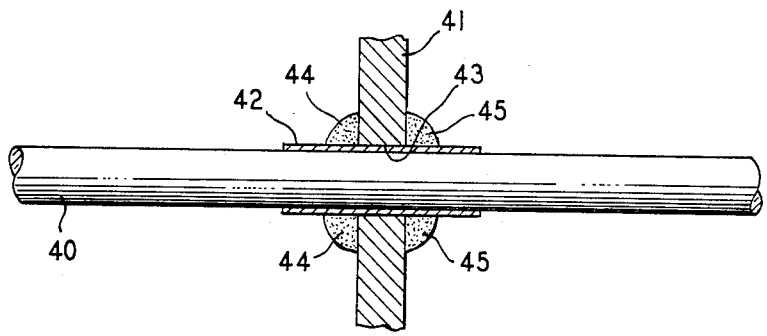
FIG. 4 is a cross-sectional view of a vacuum or hermetic seal formed between an optical fiber and a metallic housing in accordance with the present invention.

The description which follows is primarily directed towards the formation of optical fiber splices, terminations and hermetic seals. However, it will be understood that such description is exemplary only and is for purposes of exposition and not for purposes of limitation. It will be readily appreciated that the inventive concept described is equally applicable for joining any glass member to either any other glass member or other metallic member, structure or device.

Referring to the drawings, FIG. 1 shows a splice formed between two abutted and axially aligned optical fibers 10 and 11 in accordance with the present invention. To form the splice, a thin metallic coating layer 13 and 14 is formed circumferentially around each of the fibers 10 and 11, respectively, at least adjacent the ends of the fibers to be spliced. The metallic coating layers 13 and 14 can be formed either before or after the fiber ends are prepared for splicing. However, when formed after the fiber ends are prepared, caution should be taken not to form any of the metallic coating layer on the ends of fibers 10 and 11 since such coating layer will interfere with the coupling of the light energy between fibers 10 and 11 once the splice is completed.

Metallic coating layers 13 and 14 can be formed in accordance with any method which provides a coating layer having a melting point above that of solder and to which solder will adhere. For example, coating layers 13 and 14 can be formed by depositing a metallic layer circumferentially along the entire length of the fiber during the production stage, or adjacent the intended splice area just prior to the making of the splice. The preferred method for forming metallic coating layers 13 and 14 is to coat fibers 10 and 11 with a paste specifically designed for glass adherence, such as, for example, the paste designated "Bright Platinum, 0.5X, P.ite" from Englehard Industries of Newark, N.J., which hardens into a durable metallic coating layer having a melting point well above that of solder. Such paste can be applied, for instance, by dipping the ends of fiber 10 and 11 into the paste and letting the paste harden prior to preparing the fiber ends for splicing.

Once fibers 10 and 11 have metallic coating layers 13 and 14 formed thereon and the ends thereof prepared for splicing, fibers 10 and 11 are abutted and axially aligned by any suitable means and then soldered together. A typical apparatus for aligning and splicing fibers 10 and 11 in accordance with the present invention is shown in FIGS. 2 and 3. There, a base plate 20 and a cover plate 21 each have a V-shaped groove 23 and 24, respectively, cut along one surface thereof such that grooves 23 and 24 form a rectangular portal when the V-grooved surfaces of plates 20 and 21 are in contact. Additionally, V-grooves 23 and 24 are bifurcated by apertures 25 and 26, respectively, in respective base plate 20 and cover plate 21.

In operation, the two coated and prepared fibers 10 and 11 to be spliced are placed, end-to-end, in groove 23 of base plate 20 such that the joint between fibers 10 and 11 lies within the area of aperture 25. Cover plate 21 is then positioned on base plate 20 such that the joint between fibers 10 and 11 is exposed by aperture 26, as shown in FIG. 3. A layer of solder 15, as shown in FIG. 1, is finally formed over metallic layers 13 and 14 along the joint between fibers 10 and 11, using an appropriate heat source (not shown) such as, for example, a soldering iron or mini-torch to complete the splice. The completed splice can then be removed from between plates 20 and 21.

As explained hereinabove, metallic layers 13 and 14 can be formed along the entire length of optical fibers 10 and 11. Advantageously, such configuration provides a conductor coincident with optical fibers 10 and 11 which can be used for electrical signal or power transmission concurrent with light energy propagating in fibers 10 and 11. Therefore, the splice formed in accordance with the present invention not only permits the coupling of light energy from one fiber to the other, but also can complete an electrical connection between metallic layers 13 and 14 to extend the distance of signal or power transmission in both media. It is also to be understood that the solder can be incorporated in a pretinned fashion on coating layers 13 and 14.

FIG. 4 shows a vacuum or hermetic seal formed between an optical fiber 40 and a metallic wall 41 of a housing in accordance with the present invention. To form the seal, a thin metallic coating layer 42 is circumferentially formed on fiber 40 at least in the area where the seal is to be made. Fiber 40 is next inserted through aperture 43 in wall 41, which has a slightly larger cross-sectional configuration than that of fiber 40, until metallic coating layer 42 is positioned to extended through and beyond wall 51. A continuous bead of solder 44 is then formed around fiber 40 to adhere to metallic coating layer 42 and one side of metallic wall 41 and seal the joint therebetween. Although solder bead 44 is sufficient to provide a vacuum or hermetic seal having long-term stability, it is also possible to form a second continuous bead of solder 45 around fiber 41 to seal the joint between metallic coating layer 42 and the other side of wall 41. The hermetic seal can also be formed in accordance with the present invention by flowing solder into the space between metallic coating layer 42 and the wall surface of aperture 43.

In a development disclosed in copending patent application Ser. No. 667,961, filed for I. Camlibel et al. on Mar. 18, 1976, an optical fiber is hermetically sealed to a metal housing containing a junction laser by inserting a thin walled copper tube through the housing wall, tinning the tube with 60:40 tin-lead solder, threading and centering the fiber through the tube, filling the tube with 60:40 tin-lead solder and allowing the solder to cool. The solder, upon solidifying and cooling, squeezes against but does not adhere to the fiber and forms a hermetic seal.

Figure 5:
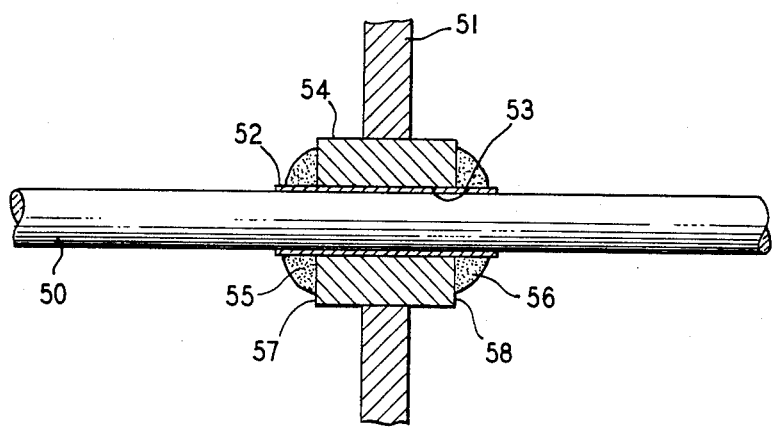
FIG. 5 is a cross-sectional view of a vacuum or hermetic seal formed between an optical fiber and a nonmetallic housing in accordance with the present invention.

FIG. 5 shows an arrangement similar to FIG. 4 for providing a vacuum or hermetic seal between an optical fiber 50 and a nonsolder adherable wall 51 of a housing. To form the seal, a thin metallic coating layer 52 is circumferentially formed on fiber 50 in the manner hereinbefore described for metallic coating layers 13, 14 and 42. The coated fiber 50 is inserted through an aperture 53, which has a slightly larger cross-sectional configuration than that of fiber 50, in a metallic sleeve device 54 which has been both extended through and hermetically sealed to wall 51 by any known means. Once metallic layer 52 is positioned to extended through aperture 53, a continuous bead of solder 55 is formed around fiber 50 to seal the joint between metallic layer 52 and the edge 57 of sleeve device 54. When desired, a second continuous bead of solder 56 can be formed around fiber 50 to seal the joint between metallic layer 52 and the other edge 58 of sleeve device 54.

Figure 6:
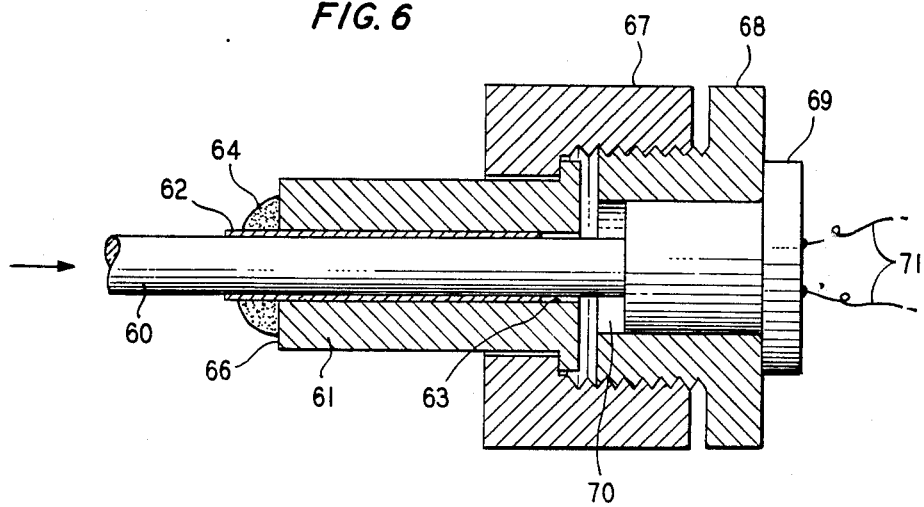
FIG. 6 is a cross-sectional view of a typical optical fiber termination in accordance with the present invention.

FIG. 6 depicts an exemplary arrangement for terminating an optical fiber 60 to a metallic terminating means 61. The termination is formed by applying a thin metallic coating layer 62 circumferentially around optical fiber 60 at least in the area adjacent the end to be terminated. The coated fiber is inserted into an aperture 63 extending axially through metallic termination means 61 until the end of fiber 60 is in the desired position. With metallic layer 62 protruding from the edge 66 of terminating means 61 opposite the edge adjacent the end of fiber 60, a continuous bead of solder 64 is formed on metallic layer 62 and around fiber 60 to both fixedly attach metallic layer 62, and fiber 60, to terminating means 61 and seal the joint between metallic layer 62 and edge 66 of terminating means 61. Molten solder can alternatively be flowed into the space between metallic coating layer 62 and the wall surface of aperture 63 to seal the joint therebetween.

Terminal means 61 can further comprise an internally threaded nut 67 which is axially rotatable around terminal means 61 and extends beyond the edge of terminating means 61 adjacent the terminal end of fiber 60. A sleeve 68 mounts a terminal device 69, such as, for example, a light detector, in a central axially aligned aperture 70. Additionally, sleeve 68 has threads formed on the peripheral surface adjacent one end thereof which match the threads on nut 67 to permit the mounting of terminal device 69 into contact with the end of fiber 60. In this position, light propagating from left to right in fiber 60 is detected by detector 69 and converted to an equivalent electrical signal for transmission to an external circuit (not shown) over leads 71.

It is to be understood that the above-described apparatus for terminating an optical fiber is exemplary only, and is for purposes of exposition and not for purposes of limitation. It will be readily appreciated that the terminal device can comprise any suitable configuration for terminating an optical fiber including, for example, certain devices presently used for solderably terminating wires. Additionally, a plurality of optical fibers can each be terminated in the manner described in association with FIG. 6 in a multiapertured terminal device similar to the well-known circular type electrical connector.

It is to be understood that the above-described embodiments are simply illustrative of the principles of the invention. Various other modifications and changes may be made of those skilled in the art which will embody the principles of the invention and fall within the spirit and scope thereof.

What is claimed is:

1. A method of splicing optical fibers comprising the steps of
   a. forming a first thin metallic layer having a melting point above that of solder circumferentially on the peripheral surface of a first optical fiber at least in the area immediately adjacent the end thereof to be spliced;
   b. forming a second thin metallic layer having a melting point above that of solder circumferentially on the peripheral surface of a second optical fiber at least in the area immediately adjacent the end thereof to be spliced;
   c. axially aligning and abutting the exposed ends of the first and second optical fibers to be spliced; and
   d. applying a continuous bead of solder circumferentially around the first and second optical fiber along the joint between the first and second thin metallic layers to complete the splice.

2. A method for terminating an optical fiber to a terminal device having a solder adherable surface in the area of the intended termination comprising the steps of
   a. forming a thin metallic layer having a melting point above that of solder circumferentially on the peripheral surface of the optical fiber at least in the area of the intended termination;
   b. positioning the optical fiber and the thin metallic layer thereon adjacent the solder adherable surface on the terminal device; and
   c. flowing solder along the joint between the thin metallic layer on said optical fiber and the solder adherable surface on the terminal device and allowing said solder to cool.

3. A method of forming a hermetic seal between an optical fiber and a housing wall comprising both an aperture therethrough and a solder adherable surface on the housing wall adjacent at least one end of the aperture, comprising the steps of:
   a. forming a thin metallic layer having a melting point above that of solder completely around the outer peripheral surface of the optical fiber at least in the area of the intended seal;
   b. inserting the optical fiber through the aperture in the housing wall until the thin metallic coating is both adjacent the solder adherable surface of the second member and protrudes from the aperture; and
   c. forming a continuous bead of solder around the optical fiber along the joint between the thin metallic layer on said optical fiber and the at least one solderable adherable surface on the housing wall.

4. A hermetic seal formed around an optical fiber comprising in combination
   a housing wall comprising an aperture therethrough and a solder adherable surface in the area of the aperture;
   an optical fiber inserted through said aperture comprising a thin metallic layer having a melting point above that of solder formed circumferentially about the peripheral surface of said fiber and disposed to protrude from said aperture adjacent said at least one end of the aperture; and
   a continuous bead of solder formed around said optical fiber along the joint between said thin metallic layer on said optical fiber and the at least one solder adherable surface on the housing wall.

5. An optical fiber splice comprising
   a first optical fiber comprising a first thin metallic layer having a melting point above that of solder circumferentially formed on the peripheral surface of said first optical fiber at least in the area immediately adjacent the exposed end to be spliced;
   a second optical fiber comprising a second thin metallic layer having a melting point above that of solder circumferentially formed on the peripheral surface of said second optical fiber at least in the area immediately adjacent the exposed end to be spliced, the exposed end of said second optical fiber abutting the exposed end of said first optical fiber; and
   a continuous bead of solder formed circumferentially around the first and second optical fiber along the joint between the first and second thin metallic layers to complete the splice.

6. An optical fiber splice in accordance with claim 5 wherein
   said first and second thin metallic layers are disposed along the full length of the peripheral surface of said first and second optical fiber, respectively.

7. An optical fiber termination comprising in combination
   a terminal device comprising a longitudinal aperture and a solder adherable surface adjacent said aperture;
   an optical fiber inserted in said aperture comprising a thin metallic layer having a melting point above that of solder formed on the peripheral surface of the optical fiber and disposed adjacent the solder adherable surface on the terminal device; and
   a layer of solder being disposed to seal the joint between the metallic layer on said optical fiber and the solder adherable surface on said terminal device.

8. An optical fiber termination according to claim 7 wherein
   the thin metallic layer is both formed circumferentially along the full length of the peripheral surface of said optical fiber and capable of propagating an electrical signal therealong; and
   said layer of solder additionally provides an electrical connection to the solder adherable surface on said terminal device.

9. An interconnection formed between two optical fiber waveguides comprising in combination
   a first optical fiber waveguide and a second optical fiber waveguide having their ends abutted, each of the first and second optical fiber waveguides comprising a thin metallic solder adherable coating having a melting point above that of solder circumferentially formed on the peripheral surface of said first and second optical fiber waveguides at least in the area immediately adjacent the abutted ends thereof; and
   a layer of solder formed along the joint between the thin metallic coatings on the first and second optical fiber waveguides for fixedly connecting the first optical fiber waveguide to the second optical fiber waveguide.

10. An interconnection formed between two optical fiber waveguides according to claim 9 wherein said thin metallic solder adherable coating formed on each of said first and second optical fiber waveguides both extends along the full length of each of the first and second optical fiber waveguides and is capable of propagating an electrical signal coupled to a particular coating along the full length thereof; and said layer of solder additionally forms an electrical connection between said thin metallic coatings on said first and second optical fiber waveguide to couple the electrical signal between said metallic coating layers.

* * * * *

UNITED STATES PATENT AND TRADEMARK OFFICE
CERTIFICATE OF CORRECTION

PATENT NO. : 4,033,668
DATED : July 5, 1977
INVENTOR(S) : Herman M. Presby

It is certified that error appears in the above-identified patent and that said Letters Patent are hereby corrected as shown below:

Column 3, line 46 "51" should read --41--. Column 3, line 52 "41" should read --40--. Column 5, line 48 "coating" should read --layer--. Column 5, line 50 "second member" should read --housing wall--. In FIG. 3 designation "23" should read --24--. In FIG. 3 designation "24" should read --23--.

Signed and Sealed this

Eighth Day of April 1980

[SEAL]

Attest:

SIDNEY A. DIAMOND

Attesting Officer    Commissioner of Patents and Trademarks